United States Patent
Mathieu et al.

(10) Patent No.: US 12,140,573 B2
(45) Date of Patent: Nov. 12, 2024

(54) BENCH FOR MECHANICAL CHARACTERISATION OF THIN OBJECTS

(71) Applicant: COMMISSARIAT A L'ENERGIE ATOMIQUE ET AUX ENERGIES ALTERNATIVES, Paris (FR)

(72) Inventors: Benoit Mathieu, Grenoble (FR); Marion Chandesris, Grenoble (FR); Olivier Gillia, Grenoble (FR); Come-Emmanuel Leys, Grenoble (FR); Nicolas Mariage, Grenoble (FR)

(73) Assignee: COMMISSARIAT A L'ENERGIE ATOMIQUE ET AUX ENERGIES, ALTERNATIVES Paris (FR)

( * ) Notice: Subject to any disclaimer, the term of this patent is extended or adjusted under 35 U.S.C. 154(b) by 322 days.

(21) Appl. No.: 17/787,193

(22) PCT Filed: Dec. 15, 2020

(86) PCT No.: PCT/FR2020/052444
§ 371 (c)(1),
(2) Date: Jun. 17, 2022

(87) PCT Pub. No.: WO2021/123602
PCT Pub. Date: Jun. 24, 2021

(65) Prior Publication Data
US 2023/0019225 A1 Jan. 19, 2023

(30) Foreign Application Priority Data
Dec. 20, 2019 (FR) ........................... 1915165

(51) Int. Cl.
*G01N 3/10* (2006.01)
*G01N 3/08* (2006.01)
(Continued)

(52) U.S. Cl.
CPC ................. *G01N 3/10* (2013.01); *G01N 3/08* (2013.01); *H01M 10/4285* (2013.01);
(Continued)

(58) Field of Classification Search
CPC .... G01N 3/10; G01N 3/08; G01N 2203/0019; G01N 2203/0044; G01N 2203/0048; G01N 2203/0282; H01M 10/4285; H01M 10/44
See application file for complete search history.

(56) References Cited

U.S. PATENT DOCUMENTS

2020/0132577 A1* 4/2020 Kwon ...................... G01N 3/20

FOREIGN PATENT DOCUMENTS

FR 2 806 804 A1 9/2001

OTHER PUBLICATIONS

International Search Report issued Mar. 26, 2021, in PCT/FR2020/052444 filed Dec. 15, 2020, citing document AO therein, 2 pages.
(Continued)

*Primary Examiner* — Ryan D Walsh
(74) *Attorney, Agent, or Firm* — Oblon, McClelland, Maier & Neustadt, L.L.P.

(57) ABSTRACT

A bench for mechanical characterisation of a battery cell by applying a compression force includes a frame having a first compression plate, a movable element having a second compression plate opposite the first compression plate, a compression spring for applying a compression force to the cell between the first and second compression plates, a force sensor inserted between the movable element and the spring, and movement sensors measuring the movement between the first and second compression plates. The first compression plate includes a projecting compression zone with an area equal to a portion of interest of the cell and the frame (Continued)

includes a recess surrounding a thicker frame in the frame forming a pedestal supporting the first compression plate.

21 Claims, 5 Drawing Sheets

(51) Int. Cl.
    *H01M 10/42*     (2006.01)
    *H01M 10/44*     (2006.01)

(52) U.S. Cl.
    CPC .... *H01M 10/44* (2013.01); *G01N 2203/0019* (2013.01); *G01N 2203/0044* (2013.01); *G01N 2203/0048* (2013.01); *G01N 2203/0282* (2013.01)

(56) References Cited

OTHER PUBLICATIONS

French Preliminary Search Report issued Aug. 26, 2020, in French Application No. 1915165 filed Dec. 20, 2019 (with English Translation of Categories of Cited Documents), citing document AO therein, 2 pages.
D.P. Willkinson et al. "Effects of physical constraints on Li cyclability", Journal of Power Sources, vol. 36, 1991, pp. 517-527.

\* cited by examiner

BENCH FOR MECHANICAL CHARACTERISATION OF THIN OBJECTS

TECHNICAL FIELD AND PRIOR ART

The present invention relates to a bench for mechanical characterisation of thin objects, in particular to a bench for characterisation of the mechanical properties of battery cells and more particularly of the negative electrodes of electric batteries, for example to characterise their inflating/deflating under electrical charge and discharge.

The negative electrodes of Lithium-Ion batteries with a graphite and silicon base have a very substantial variation in thickness, of about at least 10% of the thickness, during charging (inflating) and discharging (deflating). The first "formation" cycle of the cell sees an inflating of the same magnitude. For example, in the case of a silicon electrode, the thickness of the electrode increases 20% during the forming, then deflates 10% during the first discharge and gains about 10% in thickness at the next charge.

Negative electrodes containing silicon can be used in Lithium-Ion batteries. However the inflating of the silicon gives rise to several types of problems including:
  accelerated aging due to a sort of mechanical fatigue of the electrode,
  a risk of premature failure, potentially via an internal short-circuit that can result from a crushing and rupture of the separator,
  design problems of the packaging of the cell and of the battery pack. Indeed, a certain flexibility in the packaging is to be provided and the variations in volume are to be taken into account in the design of the packaging.

It is therefore desirable to be able to precisely characterise the inflating of the electrodes, and more generally of the cell and of the dependency of this inflating at the charge level and at the forces applied, so as to be able to optimise the materials and the design of the cells and battery packaging.

A bench for characterisation is described in the document "*Effects of physical constraints on Li cyclability*", D. P. Willkinson et al, *Journal of Power Sources*, 36(1991) 517-527. It includes a frame, two uprights supporting a press, a pressure sensor, a movement sensor and a housing for the cell wherein the press applies a vertical force on it. During the application of the vertical force on the cell, the frame is deformed. Furthermore the force is applied to the entire cell, not solely to the electrodes. This results in the application of an inhomogeneous pressure on the cell. The measurements are then not very precise. In addition, the measurements obtained are not characteristic solely of the inflating of the negative electrode.

DISCLOSURE OF THE INVENTION

It is consequently a purpose of the present invention to offer a bench for mechanical characterisation of thin objects that is reliable and precise, for example allowing for a precise measurement of the variation in thickness under constraint of thin objects, for example battery cells.

The purpose mentioned hereinabove is achieved by a bench for mechanical characterisation of thin objects including a frame, a movable element, means for applying a force via the movable element, the means for applying being mounted on uprights fixed to the frame, at least one force sensor, at least one movement sensor to measure the variation in thickness of the thin object and a compression face, which with the movable element applies the compression force to the thin object. The compression face is supported by the frame and is designed with the frame to isolate the compression face from the deformation of the frame resulting from the action of the uprights on the frame during the application of a compression force. Thus the measurements taken by the movement sensor are not skewed by the deformation of the frame due to the action of the uprights.

Advantageously a recess is formed in the frame around the zone where the compression face is located, this zone is relatively thick, which makes it possible to homogenise the pressure applied to the object, and prevents transmitting the parasite deformation of the frame to the compression face.

Preferably, the compression face includes a projecting central portion delimiting an application zone of pressure with a determined area. The central portion has an area less than or equal to the zone of the object that is to be characterised. Thanks to the implementation of the projecting central portion, the uniformity of the pressure applied on the cell is twice better, for the same positioning precision of the cell in the test bench, as in the absence of the projecting central portion.

Advantageously the compression force is transmitted means for applying the force to the application zone of the force by at least one connection of the punctual contact type, which makes it possible to reduce the articulation.

In an embodiment, the means for applying a vertical force include at least one compression spring.

In another embodiment, the means for applying a vertical force include an electric reduction gear assembly, pulleys, at least one cable and levers.

In another embodiment, the means for applying the vertical force include a hydraulic or pneumatic cylinder.

In another embodiment, the means for applying the vertical force include a mechanical screw cylinder.

One object of the present invention is a bench for mechanical characterisation of a thin object by application of a compression force according to a given compression axis including:
  a frame,
  a first compression face,
  a movable element that is mobile along the compression axis with respect to the frame and having a second compression face opposite the first compression face
  uprights fixed to the frame,
  means for applying a force according to the compression axis and of a determined intensity to the object intended to be located between the first and second compression faces, said force being orthogonal to the first and second compression faces, the means for applying being fixed to said uprights,
  at least one force sensor inserted between the movable element and the means for applying a force,
  at least one movement sensor disposed in such a way as to measure the movement between the first and second compression faces in the direction of the compression axis.

Furthermore, at least one of the first and second compression faces includes a projecting compression zone of which the area is less than or equal to a portion of interest of the object, and the frame includes a recess surrounding in the frame a thicker frame forming a pedestal supporting the first compression face.

Preferably, the compression zone has an area equal to the area of the portion of interest of the object.

For example, the first compression face is carried by a first compression plate including the compression zone and a measurement zone surrounding the compression zone, and at least one movement sensor is carried by the movable element and comes into contact with the measurement zone.

The bench can include for example three movement sensors distributed around the compression axis and means configured to compare their measurements and to detect a flatness defect.

The pedestal advantageously has a cross-section with an area equal to that of the compression zone.

Preferably, the pedestal has a height and/or the recess has a width such that the first compression plate is not in contact with the frame outside the pedestal.

Preferably, the compression force is transmitted from the means for applying a force to the first and second compression faces by at least one connection of the punctual contact type. For example, the force sensor is connected to the means for applying a force by a connection of the punctual contact type.

For example, the movable element includes a support plate of the second compression face, and the force sensor is linked to the support plate by a plane rest, advantageously an annular plane rest.

The movable element advantageously includes a homogenising plate of the constraints inserted between the force sensor and the support plate.

Advantageously, the means for applying a force include means for modifying the intensity of the force applied.

In an embodiment, the means for applying a force include at least one coil spring with a longitudinal axis aligned or substantially aligned with the straight line passing through the centre of the connection of the punctual contact type and the centre of gravity of the compression zone.

The bench for characterisation advantageously includes means for adjusting the orientation of the direction of the force applied by the coil spring, in such a way as to align the direction with the straight line passing through the centre of the connection of the punctual contact type and the centre of gravity of the compression zone.

In an embodiment, the means for applying a force include a step-by-step reduction gear assembly, at least one first pulley directly engaged with the output shaft of the reduction gear assembly, a second pulley, a cable between the first and second pulleys, at least one first lever having the second pulley, a second lever articulated on the first lever, and a compression rod is provided between the second lever and the second compression face.

The force sensor can be disposed between the second lever and the compression rod.

Preferably, the transmission of the force between the means for applying force and the second compression face takes place through two connections of the punctual contact type.

The compression rod is advantageously in punctual contact with the second lever and the force sensor.

The bench for characterisation can include means for aligning the first and second compression faces.

Another object of the present invention is a method for characterisation of a thin object implementing a bench for characterisation according to the invention, including:
  setting the object in place on the first compression face in such a way as to align the portion of interest with the compression zone,
  applying the second compression face on the object,
  measuring the movement between the two compression faces according to the compression force applied.

In an embodiment, a stimulus is applied in such a way as to cause a modification in the volume of the object during the measurement.

For example, the thin object is a battery electrochemical cell of which the portion of interest is the portion including the stack formed by the positive electrode, the separator, the negative electrode and a packaging around the stack, the method including, during measurements, a step of applying an electrical charge and/or discharge cycle.

BRIEF DESCRIPTION OF THE DRAWINGS

The present invention shall be better understood based on the following description and the accompanying drawings wherein.

DETAILED DISCLOSURE OF PARTICULAR EMBODIMENTS

The bench for mechanical characterisation according to the invention shall now be described more particularly for the measurement of the inflating under constraint of cells for batteries, more particularly the negative electrodes. But it will be understood that the bench for characterisation under constraint applies to any other thin object and for characterising other properties of the object for example Young's modulus.

The term "thin object" means an object extending mainly in a plane and of which the largest dimensions are in this plane. The object can include a single element or layer, or a stack of several elements or several layers of an identical, similar or different nature. One or more of these elements can react to a stimulus or several stimuli and modify the volume of the object in a direction transversal to the plane of the stack. The bench makes it possible to monitor this variation in volume.

Figure 6:
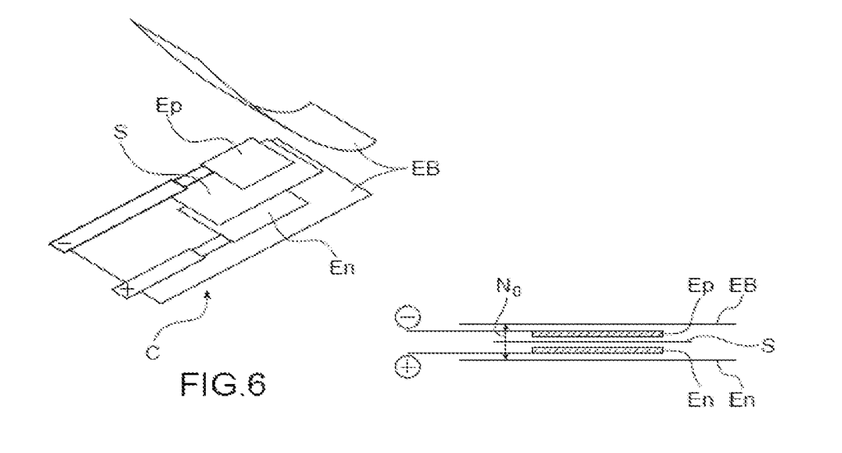
FIG. 6 is a diagrammatical representation of a cell that is to be characterised with the bench.

FIG. 6 is a diagrammatical representation of a cell that is a thin object adapted to a characterisation by the bench according to the invention. It includes a positive electrode Ep, a negative electrode En, a separator S and the packaging EB surrounding the electrodes separated by the separator.

"Nominal thickness" will be used to designate the thickness of the stack formed by the positive electrode, the negative electrode, the separator and the packaging.

The section of nominal thickness is the portion of the cell having the nominal thickness. It has an area equal to that of the cell having the smallest area, generally it is the area of the positive electrode in such a way as to guarantee good electrochemical operation.

In the case of electrochemical cells, it is sought to characterise the section of nominal thickness reliably and precisely.

In the case of a battery cell, the stimulus is the electrical charge and/or discharge.

Figure 1:
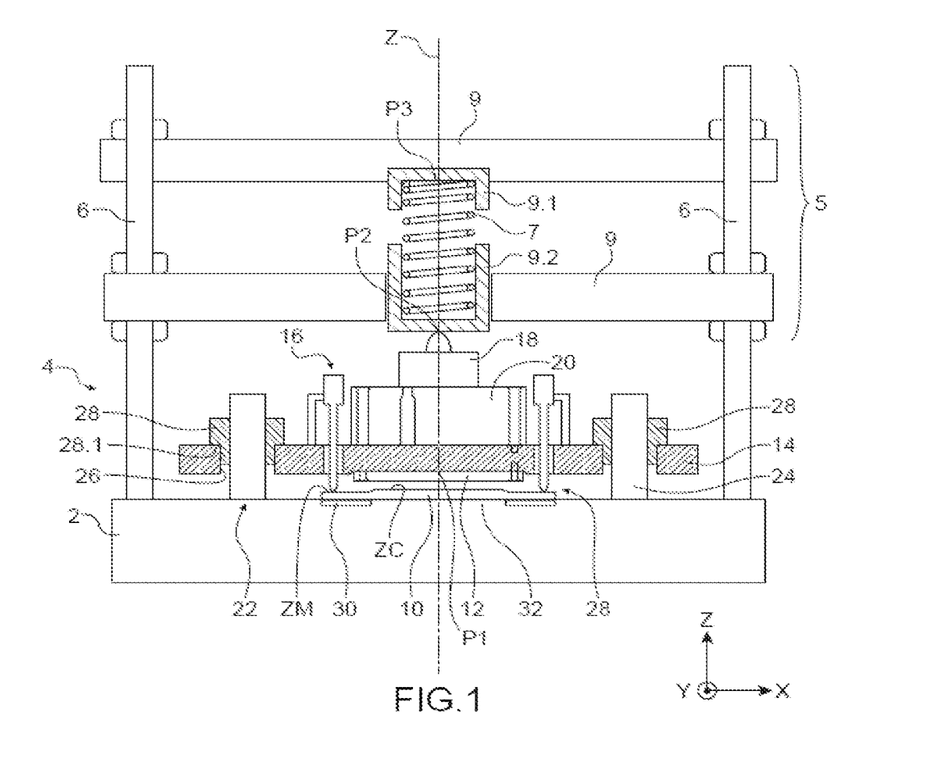
FIG. 1 is a diagrammatical representation of a bench for mechanical characterisation of a thin object

FIG. 1 is a diagrammatical representation of an embodiment of a bench for characterisation according to the invention.

The bench for characterisation includes a frame 2 forming a base for the bench, a movable element 4 mounted mobile in translation in the vertical direction Z, and means 5 for applying a force according to the vertical direction Z. The directions X and Y are directions orthogonal to the axis Z. The frame has the form of a thick plate.

The means 5 for applying a force according to the vertical direction Z are mounted on two uprights 6 each fixed by an end in the frame 2. The uprights 6 makes it possible to ensure an acceptable orientation of the force applied according to the desired direction, i.e. the direction Z, and makes it possible to reduce the forces and parasite moments on the movable element and therefore on the cell to be tested.

In this example, the means for applying the force include a coil spring 7 maintained in compression, the spring being coaxial to the axis Z. Preferably, the means for applying the force make it possible to modify the intensity of the force applied. In the example shown, the spring 7 is bearing against by its longitudinal ends between two crosspieces 9 perpendicular to the direction Z and fixed to the uprights 6 and of which the relative distance in the vertical direction can be adjusted, making it possible to modify the compression of the spring 7 and therefore the force applied to the cell. Preferably, the means of compression are able to apply a force of 10 kN over 10 cm$^2$, i.e. 10 MPa.

Advantageously the crosspieces 9 each include a seat 9.1, 9.2 respectively housing the upper longitudinal end and the lower longitudinal end of the spring 7 and fixing the alignment of its axis with the axis Z along which the force is to be applied.

Advantageously, means can be provided to adjust the alignment of the axis of the spring with the axis Z. For example the seat 9.1 of the upper crosspiece 9 can have several positions in a direction perpendicular to the axis Z to adjust the alignment of the spring to the axis Z.

The bench includes a constraint application zone 8 configured to receive the thin object, for example a battery cell C, and to apply a compression to it. With a concern for simplicity, the thin object will be designated by "cell".

The constraint application zone includes a lower compression plate 10 and an upper compression plate 12.

The lower compression plate 10 rests on the frame and is fixed along the vertical direction and in the plane XY. The lower compression plate 10 includes a compression zone ZC which is located at the centre of the plate and a measurement zone ZM surrounding the compression zone ZC. The movement sensor or sensors described hereinbelow are in contact with the measurement zone.

The upper compression plate 12 is carried by the movable element in such a way as to be vertically in line with the lower compression plate 10.

Preferably, the lower compression plate 10 is made of a hard material, for example from a material having a Young's modulus greater than 160 GPa, for example made of steel preventing crushing by the pressure.

Preferably, the upper compression plate 12 is also made from a hard material, for example having a Young's modulus greater than 160 GPa, for example it is made from steel.

The lower and upper compression plates have a certain flatness in order to ensure the homogenous application of the constraints within the cell, for example the faces of the compression plates are rectified having advantageously a difference in flatness less than 1 µm.

It is possible to reduce the number of parts, in particular by combining together the flat compression functions with the adjacent parts. However the implementing of separated parts offers the advantages of being able to replace them in case of defect and to change the geometry according to the objects to be tested.

The movable element includes a support plate 14 on which the upper compression plate 12 is fixed, for example by means of screws, at least one movement sensor 16 intended to measure the movement along Z between the lower compression plate 10 and the upper compression plate 12. In the example shown and advantageously, three movement sensors 16 distributed around the axis Z are implemented. The movement sensor or sensors 16 include a body fixed on the support plate and a finger that is sensitive to the movement in contact with the measurement zone ZM of the lower compression plate 10. Preferably, the movement sensor or sensors is or are one or more passive electrical sensors of linear movement or LVDT (Linear Variable Differential Transformer). Alternatively, this can be one or more capacitive sensors. Several movement sensors are advantageously implemented, which makes it possible to detect the flatness defects during the compression, i.e. for example a tilting of the movable element.

In the example shown, the bodies of the movement sensor or sensors are fixed to the plate and the fingers pass through the support plate via vertical through-passages arranged in the latter. The section of the passages is sufficient to prevent any interaction between the sensors and the support plate 14, in particular in the case where the sensor is equipped with a bellows, for example when the sensor is a passive electrical sensor of linear movement or LVDT (Linear Variable Differential Transformer), making it possible to prevent a contact between the bellows and the plate 14.

For example, when battery cells are characterised, movement sensors having measurement reproducibility specifications with a maximum of 150 nm and a travel of 2 mm are preferably chosen.

The bench also includes a force sensor 18 inserted between the movable element and the means for applying a force 5. The force sensor 18 is aligned with the axis Z along which the force is applied. The force sensor 18 measures the force applied on the cell. Note that the weight of the movable element (support plate, upper compression plate, movement sensor or sensors and possibly homogenising plate) is to be taken into account to correct the force measured by the sensor 18.

By way of example, the force sensor can be a sensor using an elastically deformable part and including deformation gauges, more preferably sensors with four gauges organised as a "complete bridge" and calibrated in temperature in order to guarantee a precise measurement without deviation over time, which therefore does not require any periodic calibration. By way of an example only it is possible to use a D-Mesure® movement sensor, model K450H-10 kN.

In the example shown, the movable element also advantageously includes a homogenising plate 20 that ensures the flatness of the compression surface in the presence of the force of the spring by homogenising the constraints in the support plate 14. The homogenising plate 20 is preferably made from a hard material, preferably having a Young's modulus greater than 160 GPa, for example made from steel and a thickness of at least 20 mm. This homogenising plate 20 is preferably implemented when the support plate 14 has a low thickness that does directly ensure the homogenisation of the constraints therewithin.

The force sensor 18, the homogenising plate 20 and the support plate advantageously have a fixed relative position in a direction transversal to the axis Z to ensure both the absence of shearing force on the cell and the centring of the point of application of the force on the centre of gravity of the surface of the cell, allowing for the obtaining of a uniform pressure over the surface of the cell.

For example, in particular when a D-Mesure® sensor is used, the homogenising plate includes in its upper face an imprint (not shown) to house the bottom of the force sensor and immobilise it transversally, and the homogenising plate and the support plate are fixed to one another by screws. Means of fixing, for example screws can be implemented between the force sensor 18 and the homogenising plate 20 or between the force sensor 18 and the support plate 14 when no homogenising plate is implemented.

Preferably, the connection between the means for applying a force 5 and the movable element 4 includes at least one connection of the punctual contact type of the direction of the axis Z of application of the force. In the example shown the connection of the punctual contact type is of centre P2 (point of contact between the means for applying the force and the contact sensor). Such a connection makes it possible to transmit solely a force along Z without moment, or any other force.

In the example shown, the connection of the punctual contact type is made directly by the contact between a hemispherical shape of the force sensor 18 and the flat face of the seat 9.2 of the lower longitudinal end of the spring.

Figure 2:
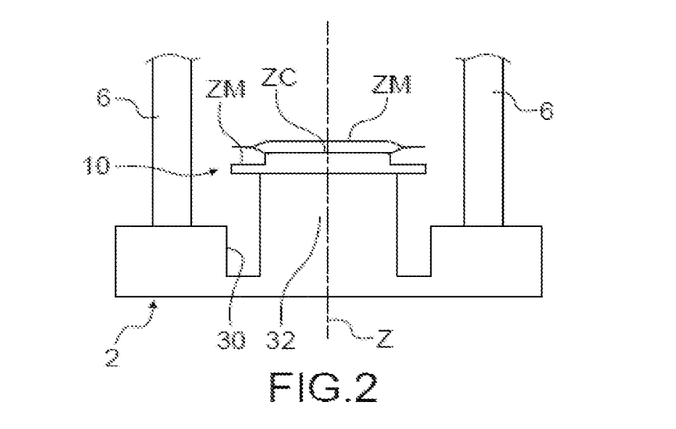
FIG. 2 is a detailed view of the frame of the bench of FIG. 1 at the application zone of the force.

The constraint application zone 8 shall now be described in detail. FIG. 2 shows an enlarged view of the bench of FIG. 1 at the application zone of the force 8.

The lower compression plate 10 includes a compression zone ZC projecting from the rest of the upper face of the plate, in particular from the measurement zone ZM. The area of the compression zone ZC is preferably less than or equal to the area of the section of nominal thickness of the cell. Thus, during the measurement, the section in compression includes over its entire surface the two electrodes. Preferably, the height of the projection is chosen so as to not compress power supply tabs or any other element existing laterally from the electrodes.

By using a compression zone having the area at most equal to the area of the section of nominal thickness at +/−2 mm, i.e. and by centring this zone on the section of nominal thickness which is of a constant thickness, the pressure applied to the cell is homogeneous and the measurements taken are reliable. Indeed, it can be demonstrated through calculation that a misalignment between the centre of gravity of the application surface of pressure and the section of the object having the nominal thickness, causes the application of an inhomogeneous pressure within the cell.

Alternatively the projecting compression zone can be carried out on the upper plate, and even both on the upper plate and on the lower plate.

Furthermore, also alternatively the movement sensors can be fixed on the lower plate and palpate the position of the upper plate.

Figure 7:
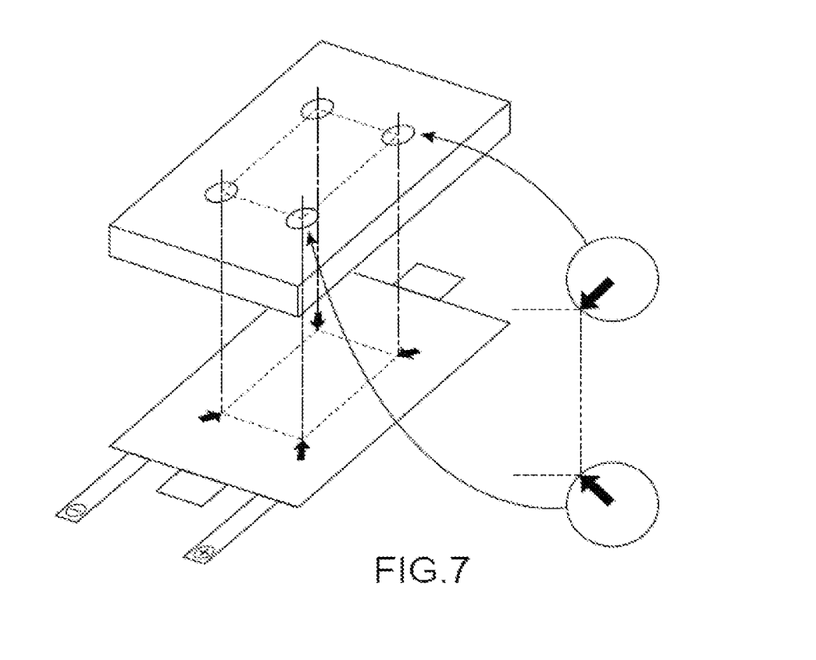
FIG. 7 is a diagrammatical representation of a method for centring the cell on the first compression plate.

Preferably, the lower compression plate 10 includes means for centring the cell on the compression zone, i.e. centring the section of nominal thickness on the compression zone ZC. In this example the means of centring include four holes at the tops of the compression zone ZC making it possible to visually centre the section of nominal thickness, which corresponds to the surface of the electrode with the smallest surface. FIG. 7 diagrammatically shows the implementation of these centring means. The corners of the electrode of the smallest surface are marked, for example, by marking with a marker the corners of the negative electrode of the cell with arrows pointing towards each corner, starting from the exterior.

The operator places the lower compression plate upside down on top of the cell to be tested, the compression zone opposite the face of the cell having the arrows. The operator aligns the plate in such a way as to align the arrows towards the inner side of the holes of the lower compression plate. The lower compression plate is made to bear against the cell which is then advantageously fixed to the lower compression plate 10 for example with an adhesive.

Alternatively, the cell can be positioned precisely and fixed on the compression portion of the upper compression assembly and then be positioned on the movable element opposite the upper compression assembly.

The setting in place and the fixing in position of the cell on the compression plate with the adhesive is facilitated if the plate on which the cell is fixed is that which does not have the sensors.

Preferably, the lower compression plate 10 and/or the frame 2 include means for centring the lower compression plate 10 with respect to the axis Z.

The frame includes in its upper face a recess 30 surrounding a projecting element 32, forming a pedestal on which the lower compression plate 10 rests. The frame is deformed under the effect of the lateral traction forces of the two uprights and of the central pressure of the cell. The implementing of a projecting element 32 on which rests the cell and through which is applied the pressure to the cell makes it possible to render uniform the pressures applied to the lower compression plate 10.

Preferably, the depth of the recess 30 is greater than or equal to the width of the application surface of the compression force, thus the deformation of the application surface of the compression force decreases substantially. For example, the deformation of the contact surface with the cell under the effect of the traction of the two uprights becomes less than 300 nm under a force of 10 kN as soon as the depth of the recess exceeds 30 mm for an application surface of the square force of a side of 32 mm.

Preferably, the height of the projecting element 32 is such that the lower compression plate is located above the upper face of the frame, in such a way as to limit, preferably prevent, any mechanical interference between the edges of the lower compression plate 10 and the upper face of the frame, which reduces the risks of skewing the movement sensor measurements.

The recess 30 continuously surrounds the projecting element 32. In this example the projecting element 32 has a shape corresponding to the compression zone. In the example shown, the projecting element has a rectangular and even square shape corresponding to that of the compression zone ZC and its area is less than or equal to and advantageously equal to the area of the compression zone ZC Preferably, the risks of mechanical interference between the edges of the lower compression plate 10 and the edges of the recess 30 are reduced either by using external dimensions of the recess 30 that are greater than the external dimensions of the compression plate, or by using a central pad 32 that elevates the compression plate enough to prevent any contact with the compression plate including when the maximum force designed for the bench is applied. In general an elevation of 1 mm is sufficient, according to the precise shape of the support 2, a mechanical deformation calculation makes it possible to determine the minimum elevation required.

Preferably, the bench includes means for positioning 22 making it possible to fix the position of the movable element, in particular the upper compression plate 12, in the plane XY with respect to the frame, and thus ensure the aligning of points P1, P2, P3.

By fixing the position of the lower compression plate 10 with respect to the frame in the plane XY and by fixing the position of the upper compression plate 12 in the plane XY with respect to the frame, the alignment of the compression plates can be ensured and the application of a homogeneous pressure in the section of nominal thickness of the cell can be ensured.

In the example shown, the means for positioning 22 include at least two rods 24 fixed to the frame and extending vertically, cooperating with two through-holes 26 in the support plate 14, of a diameter higher than the diameter of the rods 24 and two centring rings 28 used for the positioning of the movable element. The centring rings 28 are preferably removed during measurements in order to prevent any jamming of the support plate 14 on the rods 24. The centring rings 28 include an inner diameter that is very slightly greater than that of the rods 24, an axial portion 28.1 of which the outer diameter is slightly less than that of the holes 26 and an axial portion 28.2 of a diameter than is greater is such a way as to arrange a shoulder 28.3 intended to bear against the upper face of the support plate 14. The rods 24 prevent the accidental ejection of the movable element. The centring rings 28 make it possible to precisely position the movable element and in particular to align along the axis Z the points P1 and P2 with the centre of the lower compression plate 10.

The bench is such that the points P1, P2 and P3 shown in FIG. 1 are aligned on the axis Z, along which the compression force is applied.

P1 is the centre of gravity of the compression zone ZC, P2 is the connection point of the punctual contract type between the force sensor 18 and the support plate 14 and P3 is the upper longitudinal end of the spring 7 opposite that of the side of the force sensor 18. The axis Z along which it is desired to apply the compression force to the cell passes through the points P1 and P2. As described hereinabove, the position of the point P3 in the plane XY is advantageously adjustable to align it with the points P1 and P2.

Moreover, the setting in place of the cell between the compression plates 10, 12 is such that it ensures that the section of nominal thickness is centred on the point P1.

Advantageously by choosing a compression zone ZC having the surface of the section of nominal thickness the centring of the cell is simplified and the entire section of nominal thickness is characterised.

Figure 3:
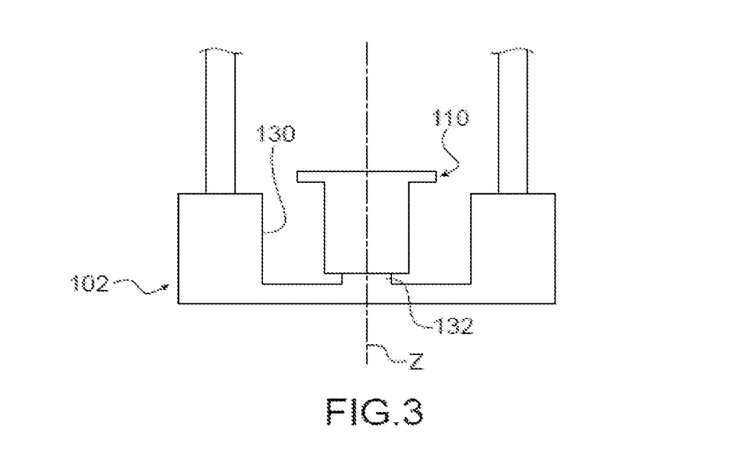
FIG. 3 is a detailed view of the frame of another example of a bench for characterisation at the application zone of the force.

FIG. 3 shows another embodiment of the frame and of the lower compression plate. In this example, the frame 102 includes a recess 130 and a projecting element 132 of low thickness and the lower compression plate 110 includes a thick central portion of which the upper face forms the compression zone which is bordered at its upper face by a plateau forming the measurement zone. The external dimensions of the recess and the external dimensions of the external compression plate are chosen to prevent any contact in case of substantial deformation of the frame.

Figure 4:
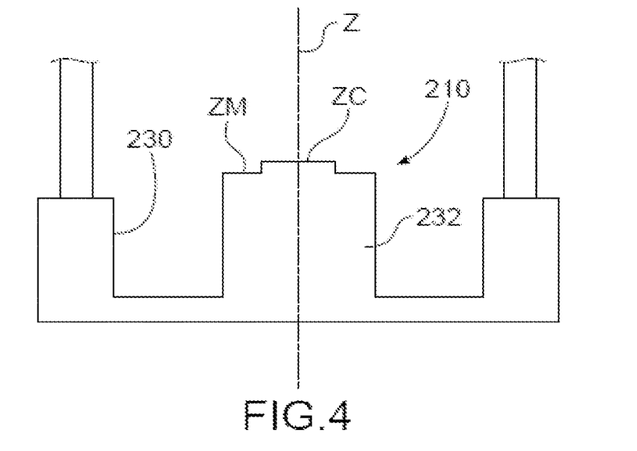
FIG. 4 is a detailed view of the frame of another example of a bench for characterisation at the application zone of the force.

FIG. 4 shows another embodiment of a frame and of a lower compression plate wherein the frame 02 and the lower compression plate 210 are made from a single piece, for example via machining.

The frame includes a recess 230 and a projecting element 232 having at its free end a compression zone of which the surface advantageously corresponds to the smallest zone to which it is desired to apply a pressure.

Figure 5:
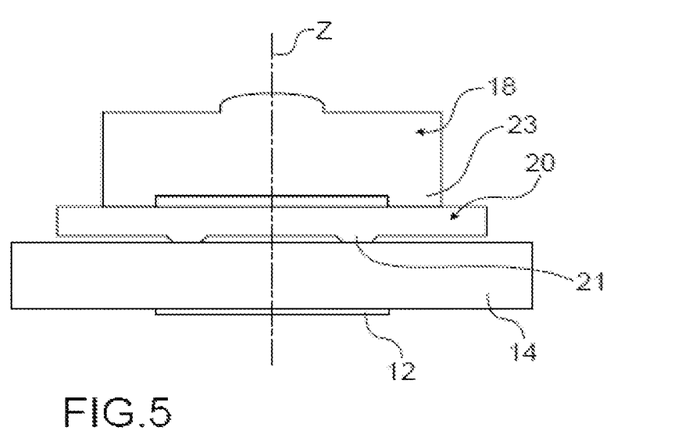
FIG. 5 is a detailed view of the movable element of the bench of FIG. 1.

FIG. 5 shows an enlarged view of a movable element according to another embodiment wherein the homogenising plate is structured in such a way as to ensure a homogenisation of the constraint applied in the support plate and in the upper compression plate while still having a reduced thickness.

In this example, the homogenising plate 20 includes on its face in contact with the support plate 14, a ring 21 projecting from the surface forming an annual bearing against the support plate 14, which limits the deformation of the lower compression plate. For example for a pressure area of 32 mm×32 mm, a ring with an outer radius of 15 mm makes it possible to minimise this deformation. Indeed, in this case, under a force of 10 kN and with a support plate 14 10 mm thick made of steel, the difference in the flatness of the support area with the cell reaches 220 nm. This difference passes to 400 nm if the outer radius of the ring is 14 mm or 16 mm for example. The value of 15 mm is therefore particularly advantageous for the contact area of 32×32 mm. Advantageously, a ring having an inner radius close to the outer radius, for example equal to 14 mm for an outer radius of 15 mm, makes it possible to limit the flatness defects of the ring itself, for example if it is carried out via turning.

Alternatively, the ring can be replaced with three contact points regularly distributed about the axis Z.

In this example the lower face of the force sensor 18 is bearing against the homogenising plate via an annular bearing face 23.

In the case of a characterisation of an object with an inhomogeneous thickness, such as for example a battery cell that includes a negative electrode and a positive electrode, the positive electrode having an area that is smaller than that of the negative electrode, the application zone of the pressure is at most equal to the section of the object to be characterised having a substantially constant thickness, i.e. in the case of a cell it entails the section of area equal to that of the positive electrode.

The bench for characterisation is particularly adapted for measuring the inflating/deflating of the cells under a charge. The bench advantageously includes means for electrically connecting the cell to a generator/to a charge according to the measurement taken.

It can advantageously be provided to dispose the bench in a thermally stable environment in order to achieve good reproducibility of the measurements. The bench for characterisation can be disposed in a temperature-controlled enclosure, wherein the bench would be protected from airflows and sources of thermal radiation. It is then possible to reach a reproducibility of the movement sensor measurements better than +/−50 nm with the bench according to the invention.

Figure 8:
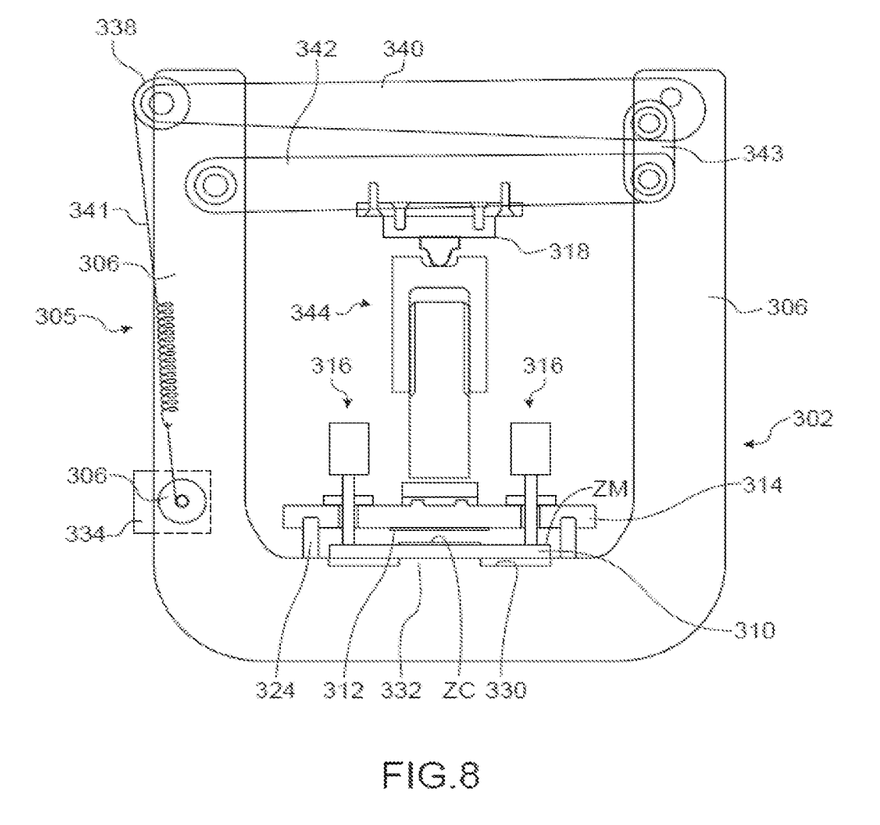
FIG. 8 is a diagrammatical representation of another example of a bench for mechanical characterisation.

FIG. 8 shows another embodiment of a bench for characterisation that differs from the bench of FIG. 1 in particular by its means for applying a force 305. In this example, the bench includes a frame 302, two uprights 306 on either side of the application zone of the force and each formed by a pair of flanges disposed at a distance from one another. The bench includes a lower compression plate 310 resting on a pedestal 332 surrounded by a recess 330 made in the frame 302, and an upper compression plate 312. Movement sensors 316 are carried by the support plate 314 and are intended to be in contact with the measurement zone ZM.

The means of compression 305 are carried by the uprights 306. They include an electric reduction gear assembly 334 of which the output shaft is directly engaged with a winding drum 336, a pulley 338 carried by a first end of a first lever 340 that is articulated by a second end to a pair of flanges about a horizontal axis, a cable 341 wound on the drum 336 and the pulley 338, a second lever 342 articulated in rotation on the other pair of flanges about a horizontal axis and connected to the first lever 340 by a tie-rod 343. Alternatively, the simple hoist shown in FIG. 8 can be replaced with a multiple hoist by adding pulleys on the axis of the lever and on an axis integral with the frame, so as to further multiply the compression force obtained for a given motor torque.

The force sensor 318 is fixed on the second lever 342 oriented in the direction of the application zone of the force. A compression rod 344 is inserted between the force sensor 318 and the support plate 314 and transmits the force to the second compression plate.

In the example shown and very advantageously, the force is transmitted between the means 305 and the application zone of the force by two punctual or quasi-punctual contacts. In this example, the compression rod 344 is in punctual contact by its first end with the force sensor 318 and by its second end with the support plate 314. In the example shown, the support plate 314 includes a hemispherical element bearing against a planar end of the compression rod 344 and the hemispherical end of the force sensor 318 is bearing against the other planar end of the compression rod 344.

Implementing the two punctual or quasi-punctual connections makes it possible to reduce, and even suppress the articulation forces.

Activating the reduction gear assembly 334 modifies the position of the first and second lever with respect to one another, modifying the force applied.

The means for applying the force 305 by using a multiple hoist with 6 strands can make it possible to amplify the force by a factor of 100. The flexibility of the system as a whole thus allows a motor provided with a reduction gear allowing for 6000 steps/revolution to adjust the force applied to at least the nearest 1 N. The reduction gear assembly can be controlled to modify the force applied according to the inflating, and thus maintain the compression force constant or vary the compression force.

The means 305 have the advantage of storing a low energy relative to the spring, the risks of ejection of the movable element are therefore reduced. The centring rods 324 can be chosen thin since they now only have the role of centring.

Advantageously, the compression rod has a variable length, for this it can include two portions connected to one another by screwing, which allows for the easy removal thereof and to release a large height between the means 305 and the movable element, making it possible to be able to access the lower compression plate and the movement sensors, and to easily remove the lower compression plate and the movement sensors.

Alternatively the force sensor is disposed between the support plate and the compression rod. The connection of the punctual contact type is then made between the sensor and the compression rod. The other end of the compression rod is for example provided with a tip that is placed in a conical cavity so as to centre it on the axis Z. A connection of the punctual contact type is thus obtained. The system makes it possible to provide a practically punction bearing of the compression rod on the lever so as to cancel the articulation forces.

Preferably springs are provided to maintain the levers in the upper position making it possible to easily remove the compression rod and therefore the lower compression plate.

In this example, two movement sensors are implemented. They are symmetrically disposed with respect to the centre of gravity of the compression zone and the average of the measurements of the two sensors is used.

An operating example of the bench for characterisation of FIG. 1 to characterise a cell shall now be described.

The cell is position on the lower compression plate 10 such as was explained hereinabove, i.e. by aligning the section of nominal thickness with the compression zone ZC.

The movable element is blocked in a high position in order to allow for the setting in place of the lower compression plate 10.

The lower compression plate is then positioned on the projecting element 32 of the frame. Means, for example centring studs, fixing the position of the lower compression plate in a given position in the plane XY with respect to the frame.

The movable element was positioned beforehand with respect to the frame by means of rods 24 and rings 28. Then the rings 28 are removed. The point P2 and the point P1 are aligned.

The movable element is released from its high position and the upper compression plate comes into contact with the cell. The effort fixed by the spring is applied to the cell. This force is measured by the force sensor 18 taking account of the weight of the movable element.

A charge or discharge cycle is applied to the cell. The measurements can begin. The means for movement measure the movement between the movable element 4 and the measurement zone ZM of the lower compression plate 10, which is the image of the inflating or deflating of the cell under a given constraint.

It can be considered to modify the constraint applied during the measurement, for example to simulate a battery case that is more or less rigid. It is thus possible to know the behaviour of the cell by reproducing as close as possible the operating conditions of the latter.

The bench for characterisation is particularly adapted to the study of battery cells, in particular negative electrodes of Lithium-ion cells comprising silicon.

It makes it possible to create a complete mapping of the behaviour of the electrode according to the state of charge and the pressure applied.

The bench makes it possible to apply a uniform pressure on a surface of a single pair of electrodes over an area that is representative of reality for example an area of 10 cm$^2$. A uniform electrochemical and mechanical state in the entire cell is thus obtained, which makes it possible to acquire very precise data that can be used for modelling the electrode material at the electrode scale.

The bench makes it possible to apply pressures ranging up to 10 MPa making it possible to study the entire range of pressures encountered in the cells up to constraints that can be damaging for the cell, which also makes it possible to acquire data useful for the safety studies on the behaviour of cells subjected to accidental constraints.

The bench can make it possible to achieve a precision of +/−50 nm in the direction of the thickness of the electrode which is the direction of application of the force, makes it possible to measure to the nearest 1% the variations in thickness of the current electrodes (the typical variations in thickness are from 5 to 10 μm) for graphite-silicon materials in the current thicknesses.

Its operation with imposed force makes it possible to sweep the mechanical characteristics either with a constant force by varying the state of charge, or at a constant state of charge by varying the force.

The motorised bench for characterisation such as the one of FIG. 8 makes it possible to simulate the behaviour of the electrode in a cell packaging or pack having arbitrary mechanical characteristics. In this case the force applied is controlled by the thickness measured via a pre-programmed function.

In the examples described, the compression zone is configured to apply a compression force to the section of nominal thickness of the cell, i.e. its thicker section, since it is the portion of the cell that is to be characterised. It will be understood that the portion to be characterised of an object is not necessarily that which is the thickest, it could be the portion with the lowest thickness. The area of the compression zone is chosen less than or equal to the portion of the object that is to be characterised.

This bench can for example be used to characterise the crushing under force of porous materials in thin layers, for example implemented in the cells of PEMFC fuel cells.

The bench makes it possible to measure the mechanical characteristics of the different elements of the cell, in particular Young's modulus. For this, different levels of force are applied on the elements to be tested, for example on the complete cell or on the separated elements of the cell, and the movement generated under the effect of this force is measured. The movement/pressure curve constitutes a behaviour law of the object measured. For some elements, the measurement is dynamic. For example for the separator of the cell, impregnated with electrolyte, the movement is not instantaneous. It is stabilised after several tens of minutes to several hours after a change in force applied.

The invention claimed is:

1. A bench for mechanical characterisation of a thin object including a portion of interest of a given area by application of a compression force according to a given compression axis including:
   a frame,
   a first compression face,
   a movable element that is mobile along the compression axis with respect to the frame and having a second compression face opposite the first compression face,
   uprights fixed to the frame,
   means for applying a force according to the compression axis and of a determined intensity to the object intended to be located between the first and second compression faces, said force being orthogonal to the first and second compression faces, the means for applying being fixed to said uprights,
   at least one force sensor inserted between the movable element and the means for applying a force,
   at least one movement sensor disposed to measure movement between the first and second compression faces in a direction of the compression axis,
   wherein at least one of the first and second compression faces includes a projecting compression zone of which an area is less than or equal to a portion of interest of the object, and wherein the frame includes a recess surrounding in the frame a thicker frame forming a pedestal supporting the first compression face.

2. The bench for characterisation according to claim 1, wherein the compression zone has an area equal to the area of the portion of interest of the object.

3. The bench for characterisation according to claim 1, wherein the first compression face is carried by a first compression plate including the compression zone and a measurement zone surrounding the compression zone, and wherein at least one movement sensor is carried by the movable element and comes into contact with the measurement zone.

4. The bench for characterisation according to claim 3, wherein the pedestal has a height and/or the recess has a width such that the first compression plate is not in contact with the frame outside the pedestal.

5. The bench for characterisation according to claim 1, including three movement sensors distributed around the compression axis and means configured to compare measurements of the three movement sensors and to detect a flatness defect.

6. The bench for characterisation according to claim 1, wherein the pedestal has a cross-section with an area equal to that of the compression zone.

7. The bench for characterisation according to claim 1, wherein the compression force is transmitted from the means for applying a force to the first and second compression faces by at least one connection of a punctual contact type.

8. The bench for characterisation according to claim 7, wherein the force sensor is connected to the means for applying a force by a connection of a punctual contact type.

9. The bench for characterisation according to claim 7, wherein the means for applying a force include at least one coil spring with a longitudinal axis aligned or substantially aligned with a straight line passing through a centre of the connection of the punctual contact type and a centre of gravity of the compression zone.

10. The bench for characterisation according to claim 9, including means for adjusting an orientation of a direction of a force applied by the coil spring, to align the direction with the straight line passing through the centre of the connection of the punctual contact type and the centre of gravity of the compression zone.

11. The bench for characterisation according to claim 1, wherein the movable element includes a support plate of the second compression face and wherein the force sensor is linked to the support plate by a plane rest.

12. The bench for characterisation according to claim 11, wherein the movable element includes a homogenising plate of constraints inserted between the force sensor and the support plate.

13. The bench for characterisation according to claim 1, wherein the means for applying a force includes means for modifying the intensity of the force applied.

14. The bench for characterisation according to claim 1, wherein the means for applying a force include a step-by-step reduction gear assembly, at least one first pulley directly engaged with an output shaft of the reduction gear assembly, a second pulley, a cable between the first and second pulleys, at least one first lever having the second pulley, and a second lever articulated on the first lever, and wherein a compression rod is provided between the second lever and the second compression face.

15. The bench for characterisation according to claim 14, wherein the force sensor is disposed between the second lever and the compression rod.

16. The bench for characterisation according to claim 14, wherein the transmission of the force between the means for applying force and the second compression face takes place through two connections of a punctual contact type.

17. The bench for characterisation according to claim 16, wherein the compression rod is in punctual contact with the second lever and the force sensor.

18. The bench for characterisation according to claim 1, including means for aligning the first and second compression faces.

19. A method for characterisation of a thin object implementing a bench for characterisation according to claim 1, including:
   setting the object in place on the first compression face to align the portion of interest with the compression zone,
   applying the second compression face on the object, and
   measuring the movement between the two compression faces according to the compression force applied.

20. The method for characterisation according to claim 19, comprising applying a stimulus to cause a modification in a volume of the object during the measurement.

21. The method for characterisation according to claim 19, wherein the thin object is an electrochemical battery cell of which the portion of interest is a portion including a stack formed by a positive electrode, a separator, a negative electrode and a packaging around the stack, the method including, during measurements, a step of applying an electrical charge and/or discharge cycle.

\* \* \* \* \*